INVENTORS
Karl Olof Adolf Polhäll
Rolf Torsten Hermansson
Roy Erik Tore Olsson

By Pierce, Scheffler & Parker
Attorneys

United States Patent Office 3,443,400
Patented May 13, 1969

3,443,400
UNIVERSAL COUPLING, PREFERABLY FOR ROLLING MILLS
Karl Olof Adolf Polhäll, Rolf Torsten Hermansson, and Roy Erik Tore Olsson, Morgardshammar, Sweden, assignors to Morgardshammar Aktiebolag, Morgardshammar, Sweden, a Swedish joint-stock company
Filed Feb. 14, 1967, Ser. No. 615,974
Claims priority, application Sweden, Feb. 16, 1966, 1,985/66
Int. Cl. F16d 3/76
U.S. Cl. 64—8                 6 Claims

ABSTRACT OF THE DISCLOSURE

A universal coupling for torque transferring having an internally splined casing which encloses the driven hub as well as the driving spindle. The casing is axially adjustable in order to release the driven or the driving device to enable a quick change of either device.

---

In a modern rolling mill the waste time for roll changes has to be kept as short as possible. This presupposes a rapid mounting and dismounting of the rolling mill couplings. In previously used designs it has, however, been necessary to dismount the coupling, separating its different parts, a task which has been time-consuming.

This invention relates to improvements in a universal coupling preferably for rolling mills, comprising an internally-splined casing which engages and encloses the driven as well as the driving devices, both of which are provided with external splines; this coupling meets the stated requirements for rapid mounting and dismounting without being forced to dismount the coupling by separating its component parts. The coupling is intended to transmit torque in the first place from a driving roll-mill spindle to a roll neck or alternatively from a pinion neck to a rolling-mill spindle.

The universal coupling according to the present invention is mainly characterized in that by means of a device independent of the coupling, the casing is axially moveable in relation to both the driven and the driving devices in order to disengage them from each other and permit a radial movement of either device. This design makes it possible to set the spindle in an angle up to 8°.

The driven device consists preferably of a coupling hub mounted onto a shaft, and the driving device of a leading spindle with a die block.

The spindle whose driving end is shaped flat with two parallel sides is conventionally provided with slippers mounted on the two parallel sides, these slippers transmit torque from the spindle to the die block.

A coupling top is arranged on the die block, preferably by shrinking or screwing; this coupling top encloses the spindle and makes a sealing contact with it. This prestressing of the die block with a strong ring produces a negative initial stressing at the critical point of the coupling. This compressive stress considerably reduces the tensile stress when loaded.

The sealing contact between the coupling top and the spindle is mainly obtained by means of one or several sealing rings arranged in grooves in the coupling top; these sealing rings are affected by a number of springs.

The coupling which is lubricated with grease or oil filling the entire coupling space, is effectively sealed by means of this sealing ring which is in contact with a spherical part located between the round shaft and the flat end part. An additional advantage of the sealing ring is the circumstance that it contributes simultaneously to the centering of the spindle in operation.

Via the sealing rings the springs press the outer end of the spindle towards a thrust pad mounted in the die block, the contact surfaces between the thrust pad and the coupling end being rounded off, preferably spherical.

In order to seal the die block in relation to the enclosing casing the die block is provided with two cylindrical-spherical tops. These tops have also the advantage that they contribute to the centering of the spindle in operation.

The inner space of the die block, which acts as an attachment for the securing of the flat end of the spindle with the slippers arranged on the two parallel sides, is circular in the one plane coinciding with the longitudinal shaft of the spindle and at right angles to the parallel sides of the spindle end, and it has an opening for the spindle reaching into the abovementioned space. Opposite to the opening the thrust pad is arranged on the die block. Thanks to the circular shape with a large radius the stress concentration is reduced and the torsional and flexural resistance of the die block increased in the critical section of the coupling.

The enclosing and internally-splined casing is mounted in a bearing at the end facing the spindle, the bearing being provided with an extended part in the shape of an operating arm, which is adjustably mounted vertically and axially for the adjustment of the coupling in these directions. This operating arm acts as the connection with an automatic control device. The arm is guided vertically in guides, and these guides are in their turn mounted on a carriage vertically fixed, which is axially guided in guides and in addition connected with a driving mechanism such as, for example, a double-acting compressed air or hydraulic cylinder for the axial adjustment of the carriage, the vertical guides and the universal coupling. This control device makes it possible to effect rapid adjustments of the coupling. When dismounting the universal coupling the head of the coupling is disengaged from the hub in such a way that the journal becomes free and the rolls can be changed. The universal coupling and the operating arm are in their upper-limit position affected vertically by coil springs or alternatively by compressed air or hydraulic cylinders. The coupling operating arm is provided with a projection which engages the corresponding projection on the roll chock in the upper-limit position. Thus, in this position the centre line of the coupling and that of the roll coincide. This upper-limit position is chosen in such a way that the entire roll diameter range plus the allowed play are covered. Consequently, when this construction is used, the centre line of the coupling and the centre line of the roll will always coincide already in the upper-limit position when a new set of rolls is mounted onto its stands. When the set of rolls is lowered into position on the stands bringing the couplings into position, the axial gliding takes place. The previously used method of dismounting the casing, sealing ring and slippers has thus no longer to be applied.

An embodiment of the present invention will now be further described in the following, reference being made to the accompanying drawings in which.

Figure 1:
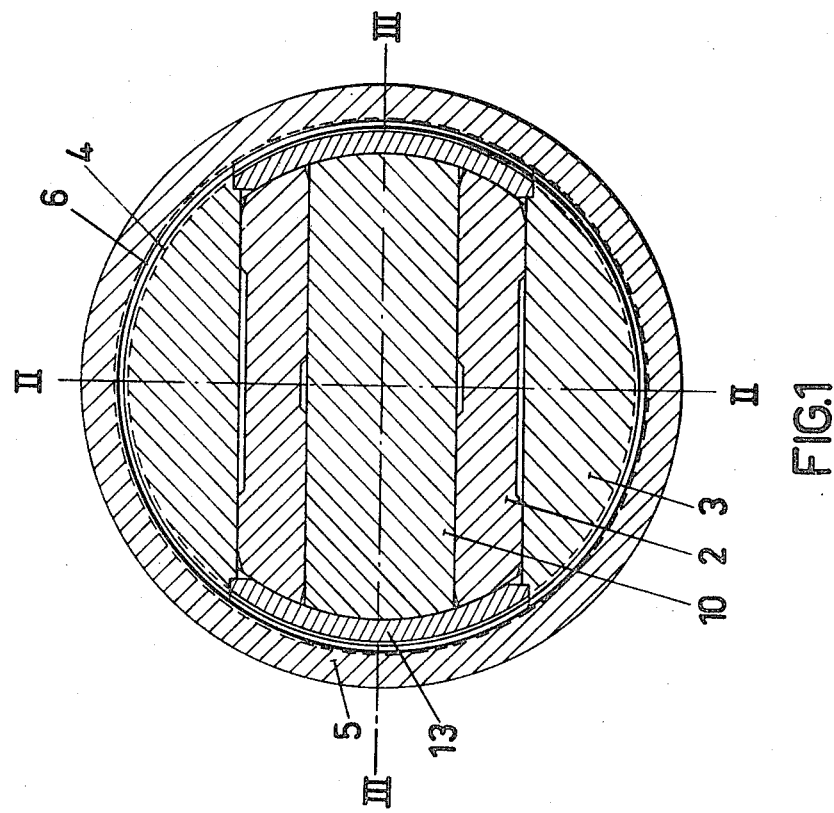
FIGURE 1 is a cross section through the universal coupling according to the present invention on the line I—I of FIGURE 2.
Figure 2:
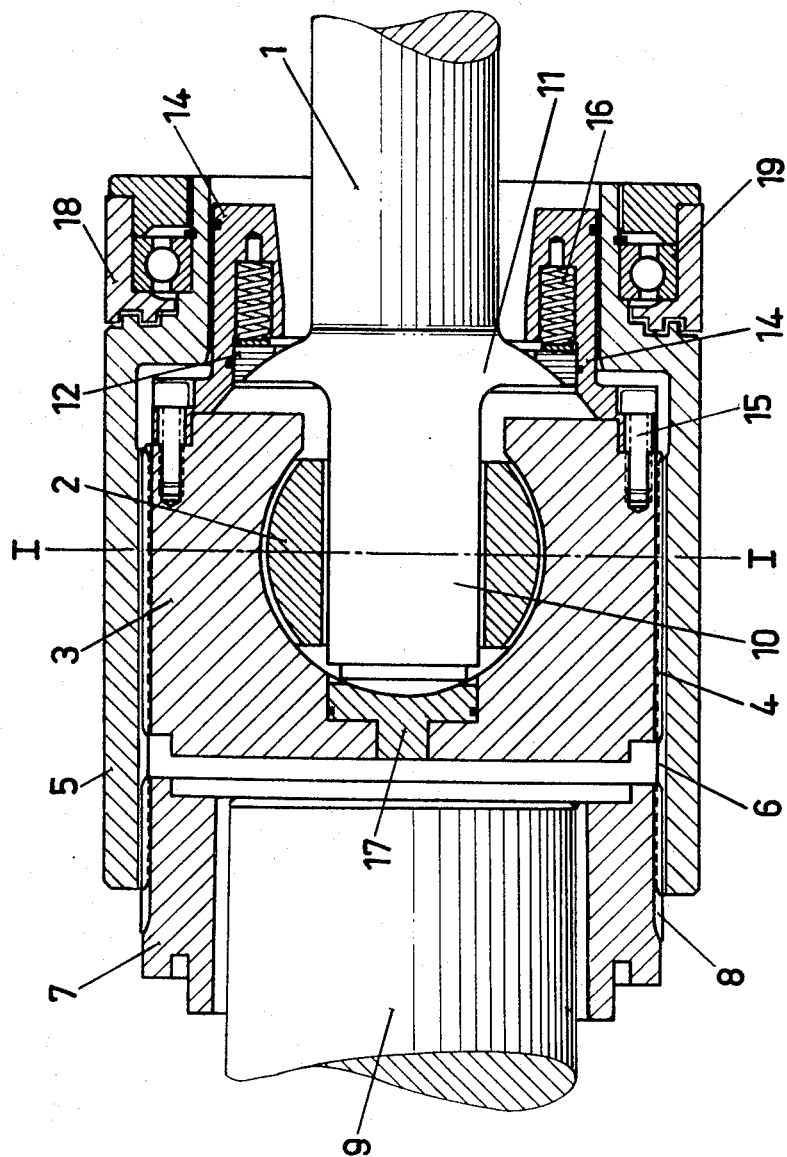
FIGURES 2 and 3 are longitudinal sections through the universal coupling on the lines II—II and III—III respectively of FGURE 1.
Figure 3:
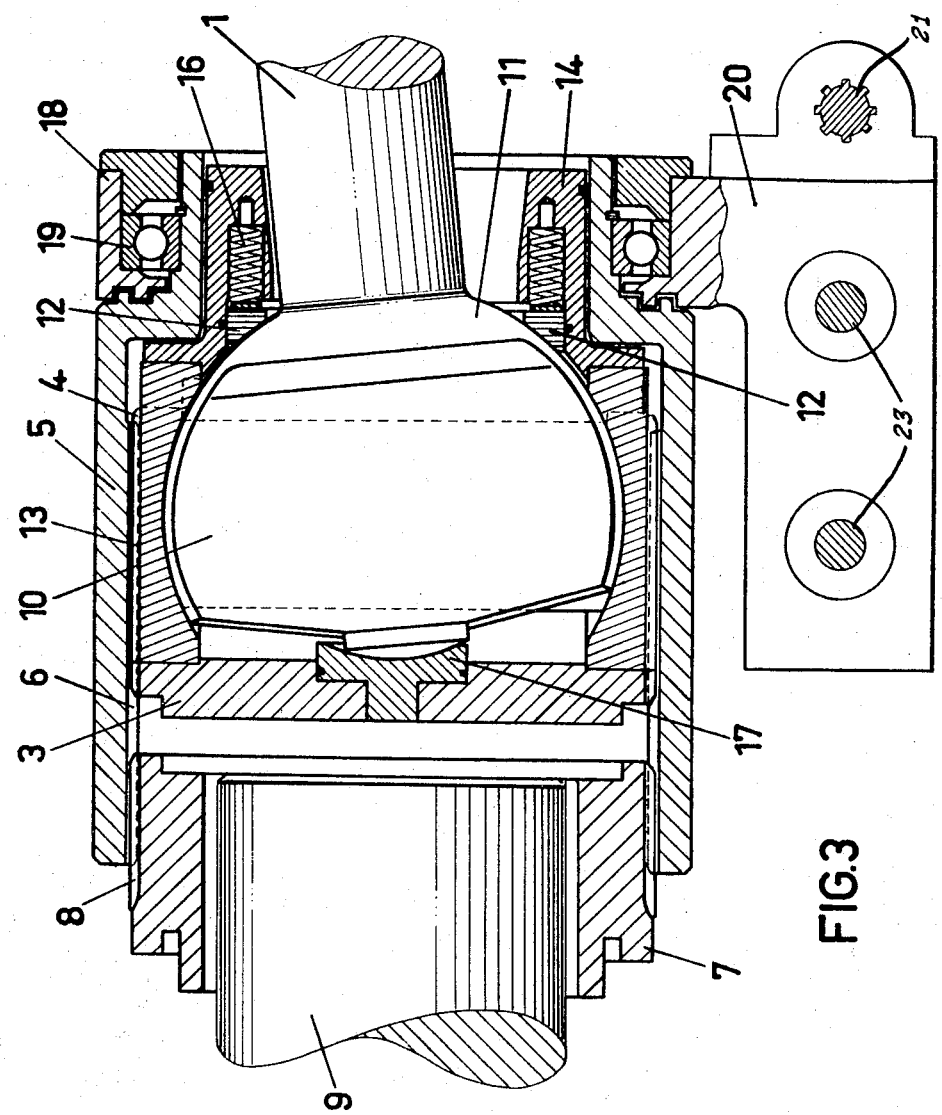

In the embodiment illustrated in FIGURES 1 to 3 there is a driving rolling-mill spindle 1. The torque is transmitted from spindle 1 via slippers 2 to a die block 3. The die block 3 is provided with external splines 4 which transmit the torque to casing 5 via its internal splines 6. The casing 5 encloses also a hub 7, and the torque is transmitted to the latter via external splines 8. The hub 7 is connected with journal 9 of the mill roll, suitably mounted by means of the forced oil method.

The end 10 of the driving spindle 1 is shaped flat with two parallel sides. Between the end 10 and the cyclindrical part of the spindle there is a flange-shaped spherical part 11.

The spindle is centered in two different ways, viz, with a sealing ring 12, and with the cap-shaped sealing tops 13.

The sealing ring 12 is arranged in a groove in a coupling top 14. This coupling top is shrunk onto the die block 3 and secured by means of screws 15. Thanks to this shrinking of the top a pre-stressing of the die block is obtained, an arrangement which improves the strength at the critical point of the coupling. The sealing ring 12 is spring-loaded by means of spring 16 placed in the same groove as the sealing ring 12. The sealing ring acts towards the flange-shaped part 11 of the spindle 1 and simultaneously presses the spindle towards a thrust pad 17 arranged in the die block.

The sealing tops 13 are two and are of a cylindrical-spherical shape. Like the sealing ring 12 these tops serve the double purpose of sealing the die block and centering the spindle in operation.

One of the ends of the casing 5 is mounted in a bearing shell 18 with bearings 19. The bearing shell 18 is movable both vertically and axially. It is provided with a coupling operating arm 20 connected with a control device.

Figure 4:
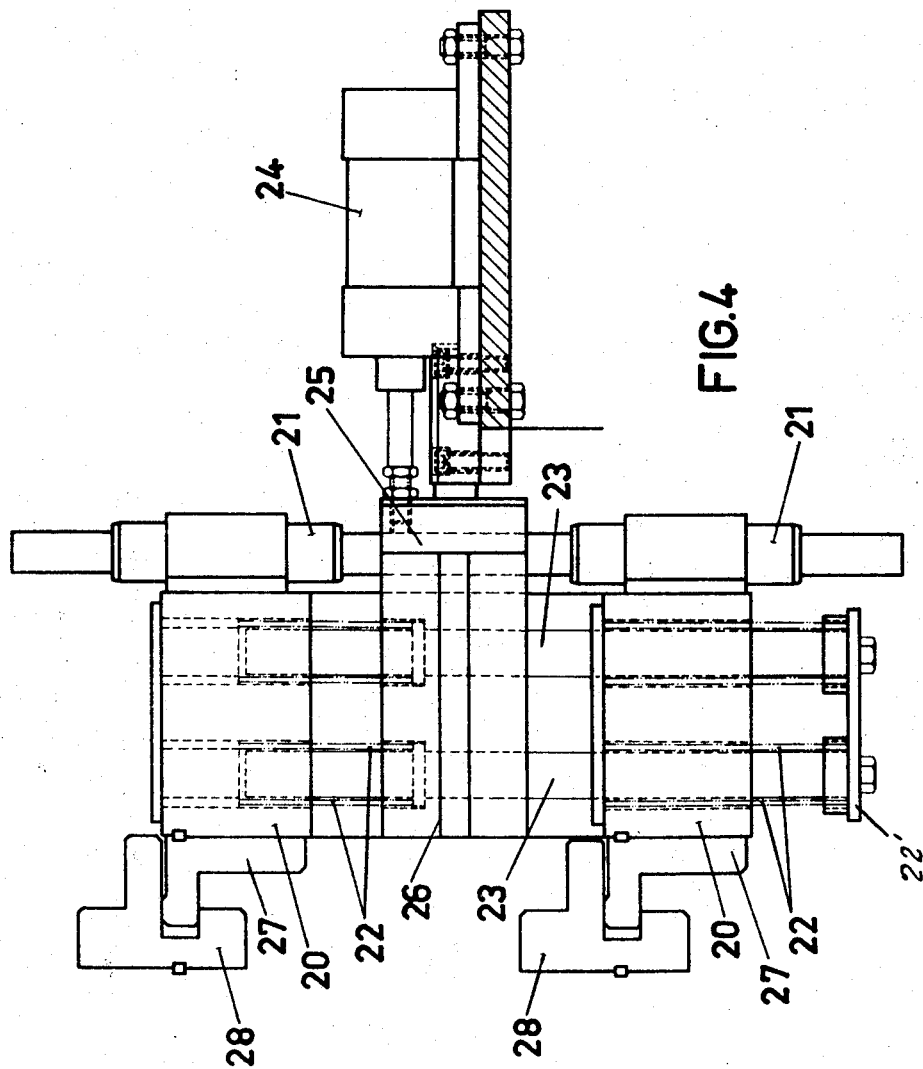
FIGURE 4 is a side view of the control device for the universal coupling according to the present invention.
Figure 5:
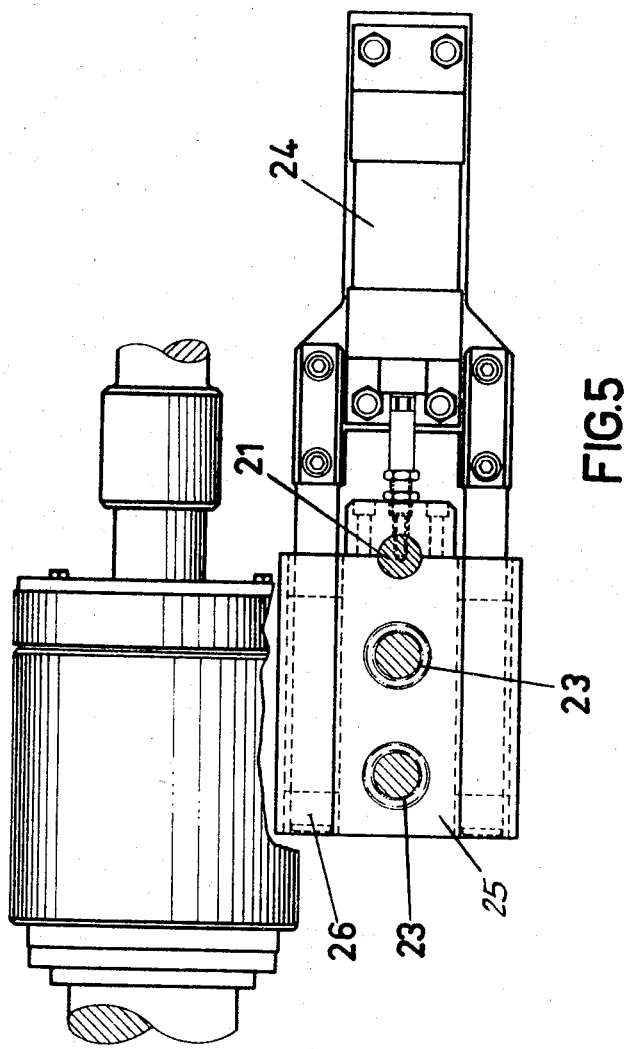
FIGURE 5 is a top view of a part of the control device.
Figure 6:
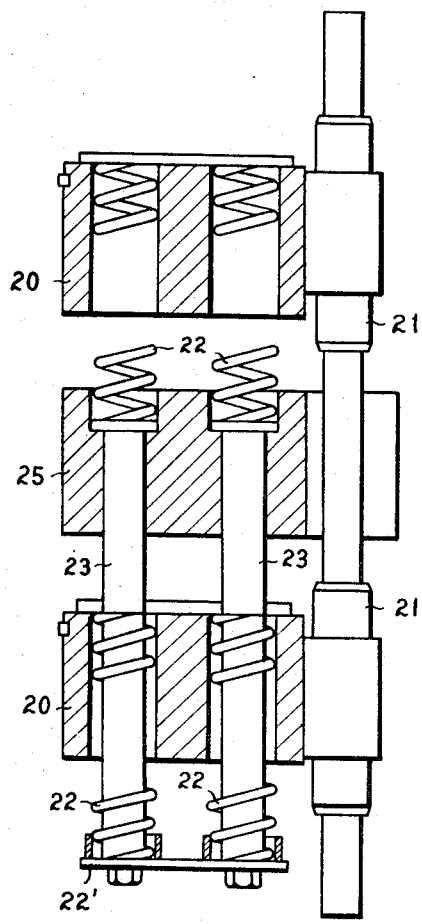
FIG. 6 illustrates details of the structure shown in FIG. 4.

In the control device illustrated in FIGURES 4 and 5 the operating arms 20 are vertically guided by means of a guide 21, e.g. either by ball guiding or splined shaft, which may possibly receive a certain torque. The vertical counterbalancing requiring in connection with a change in the distances between the rolls the so-called play) is obtained by means of coil springs 22 or alternatively by means of compressed air or hydraulic cylinders. The lower carrier 22′ of the lower springs (cylinders) is rigidly attached to a carriage 25 by means of the bars 23.

The axial or horizontal movement of the couplings and the control device which is desirable in connection with the change of rolls is obtained by means of a driving mechanism such as, for example, a double-acting compressed air or hydraulic cylinder 24 affecting one or alternatively two carriages 25 sliding on the fixed guides 26. Thus the carriage 25 is vertically fixed but horizontally movable. In order to make it possible to lift the rolls from their stands the couplings have to be adjusted (drawn back) in such a way that the hub 7 and the casing 5 are no longer engaged. The distance along which the casing has to be drawn back corresponds normally to the length of the splines of the hub 7.

Each of the arms 20 is provided with a projection 27; these projections engage the corresponding projections 28 of the roll chock. These latter projections are laterally adjusted. Thanks to the springs or alternatively the pressed air or hydraulic cylinders the projections 27 will always mesh in the projections 28 of the set of rolls within the entire roll caliber range.

When the rolls have been changed the couplings are similarly mounted with the driving mechanism 24. The set of splines on the coupling hub 7 and the casing 5 are suitably made with pointed ends in order to prevent a collision between the spline bars.

What we claim is:

1. A spindle coupling for connecting a rotary driving member to a driven member such as a mill roll which comprises an internally splined casing which encloses and engages external splines provided on said driving and driven members, means acting independently of said coupling for shifting said casing in a direction longitudinally of its axis and relative to both said driving and driven members for disengaging the splined connection between said driven member and said casing, thereby to permit radial movement of either of said members, said driven member having an externally spined hub which engages the internal splines on said casing and surrounds the journal of the mill roll, and said driving member comprising a spindle the flattened end of which is mounted in a die block for universal movement and is provided with slippers transmitting torque from said spindle to said die block, and a coupling top fastened to said die block, said coupling top enclosing said spindle and establishing contact therewith, said coupling top establishing contact with said spindle by means including at least one sealing ring, and axially acting spring means loading said sealing ring into contact with a flanged surface of the spindle, said spring means also serving to assist in centering said spindle during operation thereof.

2. A spindle coupling as defined in claim 1 wherein said die block includes a thrust pad mounted therein, and wherein said springs acting axially via said sealing ring serve to press the end of said spindle within said die block against said thrust pad, the contact surfaces between said spindle end and thrust pad being rounded off to a preferably spherical contour.

3. A spindle coupling as defined in claim 1 and which further includes a bearing shell mounting said casing at the end thereof which faces said spindle, said shell being provided with an operating arm independent of said coupling, and means adjustably mounting said arm for movement in the vertical and axial directions thereby to effect movement of said casing in such directions, said adjustable mounting means comprising a vertically disposed guide in which said arm is mounted for movement in a vertical direction, a vertically fixed but axially movable carriage mounting said vertical guide, a horizontal guide for said carriage, and a driving mechanism such as a double-acting fluid actuated cylinder and piston unit coupled to said carriage thereby to control the axial movement of said carriage, vertical guide and casing.

4. A spindle coupling as defined in claim 3 wherein said operating arm is provided with a projection which in connection with a change in rolls, meshes in a corresponding projection on the chock of the roll thereby assuring coincidence of the center line of said coupling and roll within the entire roll caliber range.

5. A spindle coupling as defined in claim 1 wherein said driven member comprises an externally splined hub which engages the internal splines on said casing and surrounds the journal of the mill roll and wherein said driving member comprises a spindle having a flattened end mounted in a die block for universal movement, and which further includes slippers located on opposite sides respectively of said flattened spindle end, the inner space of said die block being circular in the plane coinciding with the longitudinal axis of said spindle and at right angles to the flats on said spindle end, a pair of oppositely disposed cylindrical-spherical tops located between the inner surface of said casing and the ends of said flattened sides of said spindle end which serve to seal said die block and also center said spindle during its operation, a coupling top secured to said die block, said coupling top enclosing said spindle and establishing contact therewith by means including at least one sealing ring, and axially acting spring means loading said sealing ring into contact with a flanged surface of said spindle, and a thrust pad mounted within said die block facing the end of said spindle, said springs acting axially via said sealing ring to press the spindle end against said thrust pad, and the contact surfaces of said thrust pad and spindle end being rounded off.

6. A spindle coupling as defined in claim 5 and which further includes a bearing shell mounting said casing at the end thereof which faces said spindle, said shell being provided with an operating arm independent of said coupling, and means adjustably mounting said arm for movement in the vertical and axial directions thereby to effect movement of said casing in such directions, said adjustable mounting means comprising a vertically disposed guide in which said arm is mounted for movement in a vertical direction, a vertically fixed but axially movable carriage mounting said vertical guide, a horizontal guide for said carriage, and a driving mechanism such as a double-acting fluid actuated cylinder and piston unit coupled to said carriage thereby to control the axial movement of said carriage, vertical guide and casing.

References Cited

UNITED STATES PATENTS

| | | | |
|---|---|---|---|
| 2,372,289 | 3/1945 | O'Malley | 64—8 |
| 3,020,735 | 2/1962 | Wegmann | 64—8 |
| 3,079,772 | 3/1963 | Reuter | 64—8 |
| 3,302,267 | 2/1967 | Benson | 64—7 X |

FOREIGN PATENTS 939,539 10/1963 Great Britain.

HALL C. COE, *Primary Examiner.*